US010500723B2

(12) United States Patent
Nishi

(10) Patent No.: US 10,500,723 B2
(45) Date of Patent: Dec. 10, 2019

(54) MACHINING SYSTEM AND MACHINE CONTROLLER IN WHICH A MOVING ROBOT LOADS AND UNLOADS AN ARTICLE WITH RESPECT TO MACHINING DEVICE

(71) Applicant: FANUC CORPORATION, Yamanashi (JP)

(72) Inventor: Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 20 days.

(21) Appl. No.: 15/881,926

(22) Filed: Jan. 29, 2018

(65) Prior Publication Data
US 2018/0222047 A1  Aug. 9, 2018

(30) Foreign Application Priority Data

Feb. 3, 2017  (JP) .................. 2017-018619

(51) Int. Cl.
*B25J 9/16* (2006.01)
*G05D 1/00* (2006.01)
(Continued)

(52) U.S. Cl.
CPC .............. *B25J 9/163* (2013.01); *B25J 5/007* (2013.01); *B25J 9/162* (2013.01); *B25J 11/0055* (2013.01); *G05B 19/402* (2013.01); *G05B 19/4189* (2013.01); *G05D 1/0088* (2013.01); *G05D 1/028* (2013.01); *G05D 1/0274* (2013.01); *G05B 2219/39107* (2013.01);
(Continued)

(58) Field of Classification Search
CPC ........................................... G05B 2219/39132
USPC ....................................................... 700/112
See application file for complete search history.

(56) References Cited

U.S. PATENT DOCUMENTS 8,014,898 B2 * 9/2011 Nishi ............... G05B 19/41825
318/565
2008/0079152 A1  4/2008 Tanaka et al.
(Continued)

FOREIGN PATENT DOCUMENTS

CN  101100060 A  1/2008
CN  101840871 A  9/2010
(Continued)

OTHER PUBLICATIONS

Pauker et al., "OPC UA for machine tending industrial robots" Proceedings of the Second Conference on Advances in Mechanical and Robotics Engineering, Oct. 2014, pp. 79-83 (Year: 2014).*

*Primary Examiner* — Emilio J Saavedra
(74) *Attorney, Agent, or Firm* — Hauptman Ham, LLP

(57) ABSTRACT

There is provided a machining system in which for automation of loading and unloading of an article with respect to a machining device, an operation of a robot can be easily set from a machine controller of the machining device. The machining system includes a machine controller and a robot controller. The machine controller includes a communication section configured to read from a storage section setting data and a robot operation program which correspond to the type of the machined article as set by a setting section when a determination section determines that the moving robot is disposed at a predetermined position, and transmit the same to the robot controller.

6 Claims, 4 Drawing Sheets

(51) Int. Cl.
  *G05D 1/02* (2006.01)
  *B25J 11/00* (2006.01)
  *G05B 19/402* (2006.01)
  *G05B 19/418* (2006.01)
  *B25J 5/00* (2006.01)

(52) U.S. Cl.
  CPC ........... *G05B 2219/39132* (2013.01); *G05D 2201/0216* (2013.01); *Y10S 901/01* (2013.01); *Y10S 901/40* (2013.01)

(56) References Cited

U.S. PATENT DOCUMENTS

| | | | |
|---|---|---|---|
| 2011/0133336 A1 | 6/2011 | Tanaka et al. | |
| 2012/0216384 A1* | 8/2012 | Immekus | B23P 21/004 29/428 |
| 2015/0316925 A1* | 11/2015 | Frisk | B25J 9/162 700/113 |

FOREIGN PATENT DOCUMENTS

| | | |
|---|---|---|
| CN | 202394963 U | 8/2012 |
| CN | 104600058 A | 5/2015 |
| CN | 105140213 A | 12/2015 |
| CN | 105977222 A | 9/2016 |
| DE | 102010022258 A1 | 12/2010 |
| DE | 102010007462 B4 | 6/2015 |
| DE | 102015010637 A1 | 2/2016 |
| EP | 1731273 B1 | 12/2006 |
| JP | H5-324034 A | 12/1993 |
| JP | 2001-121461 A | 5/2001 |
| JP | 2003-195919 A | 7/2003 |
| JP | 2010-191602 A | 9/2010 |
| JP | 2010-247267 A | 11/2010 |
| JP | 2010-277425 A | 12/2010 |
| JP | 4676544 B2 | 4/2011 |
| JP | 5160700 B1 | 3/2013 |
| JP | 2015-182173 A | 10/2015 |

* cited by examiner

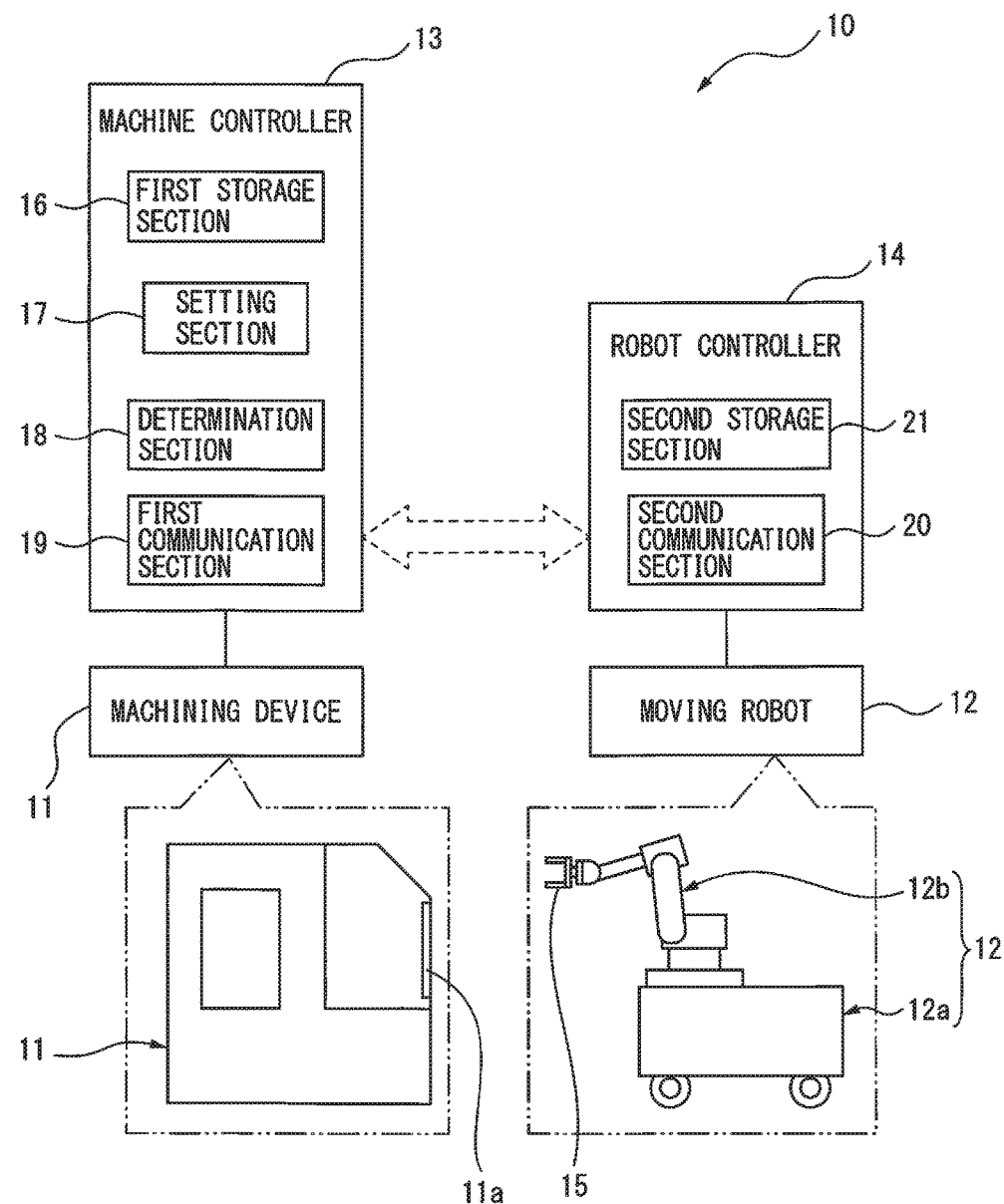

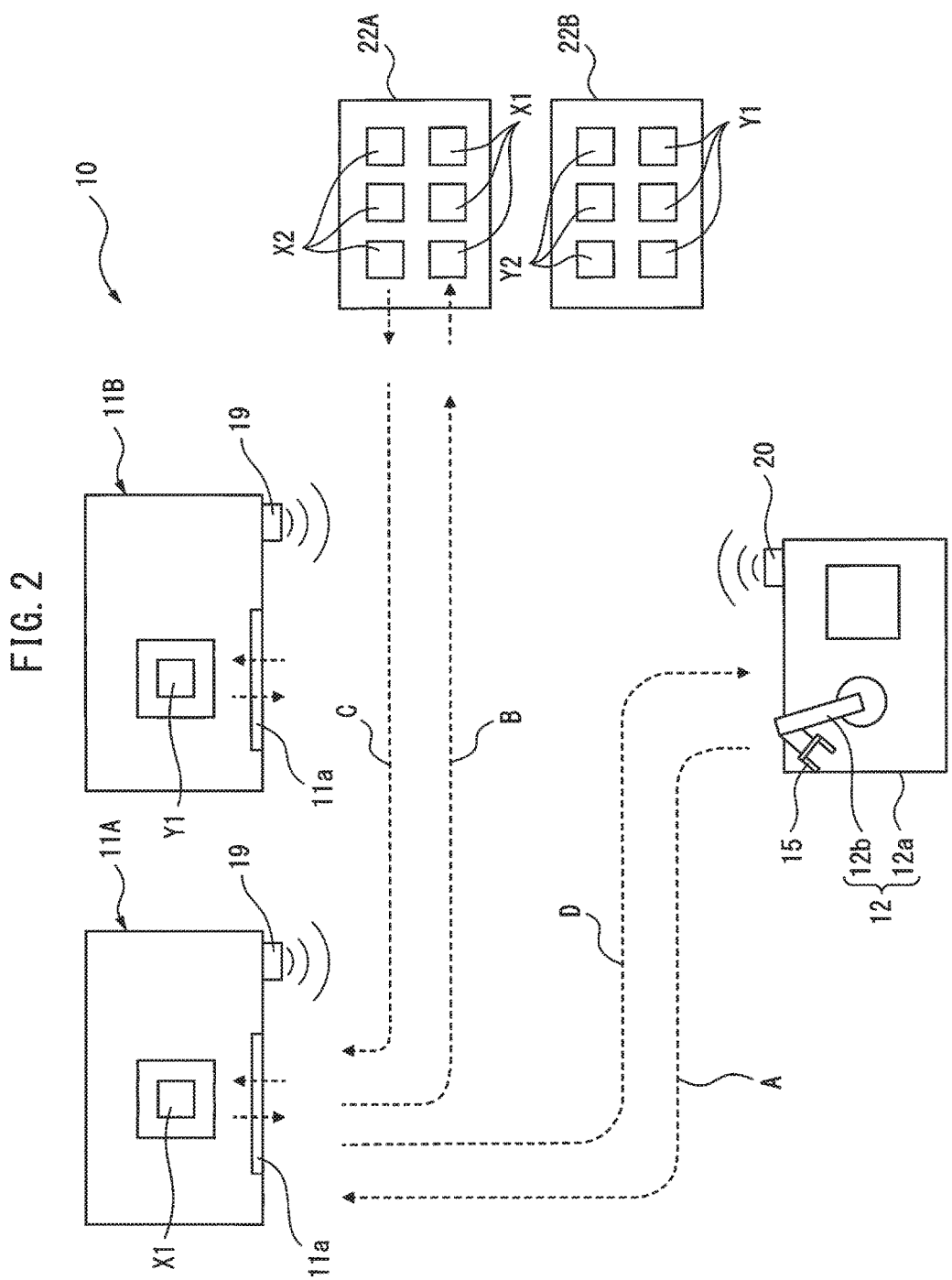

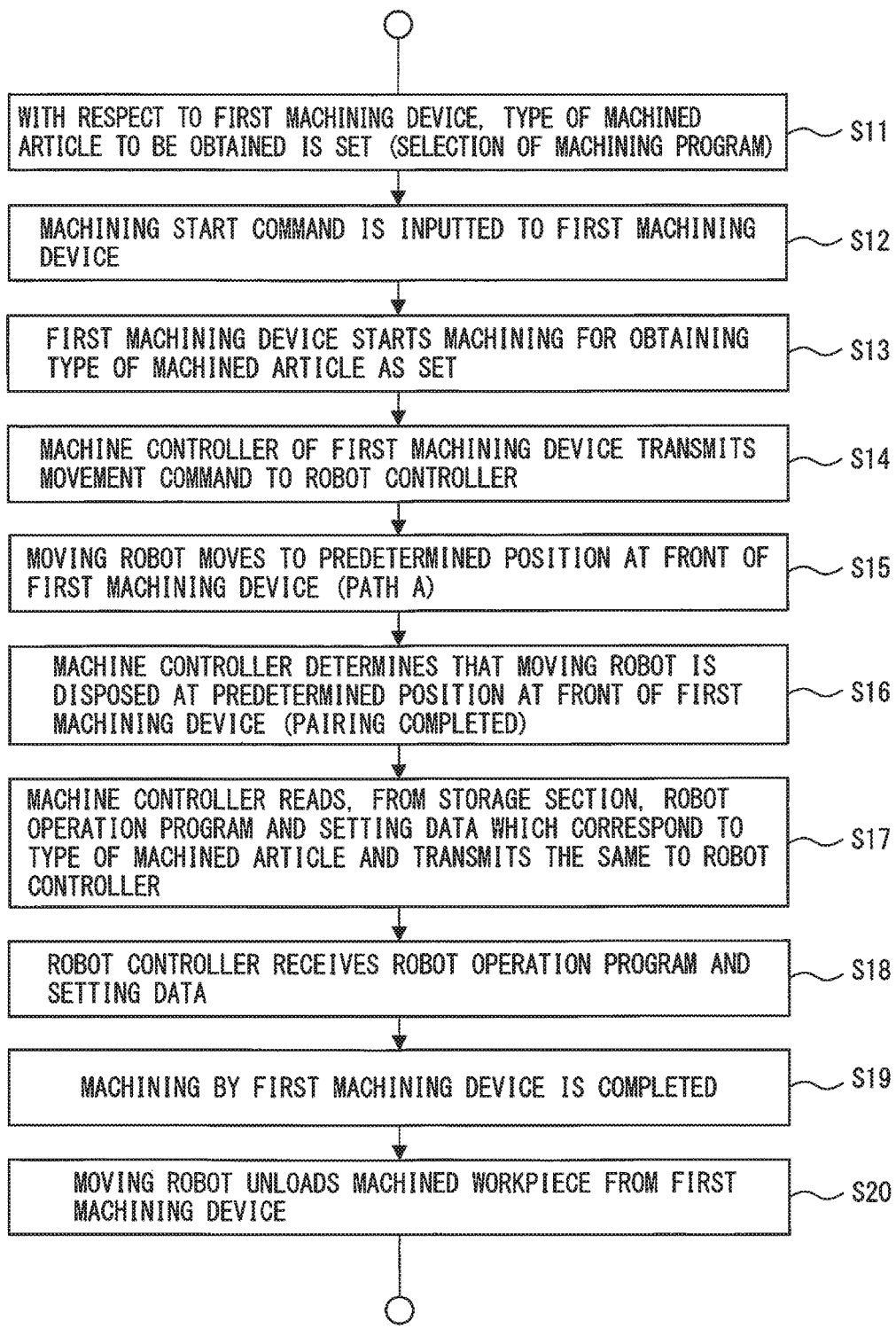

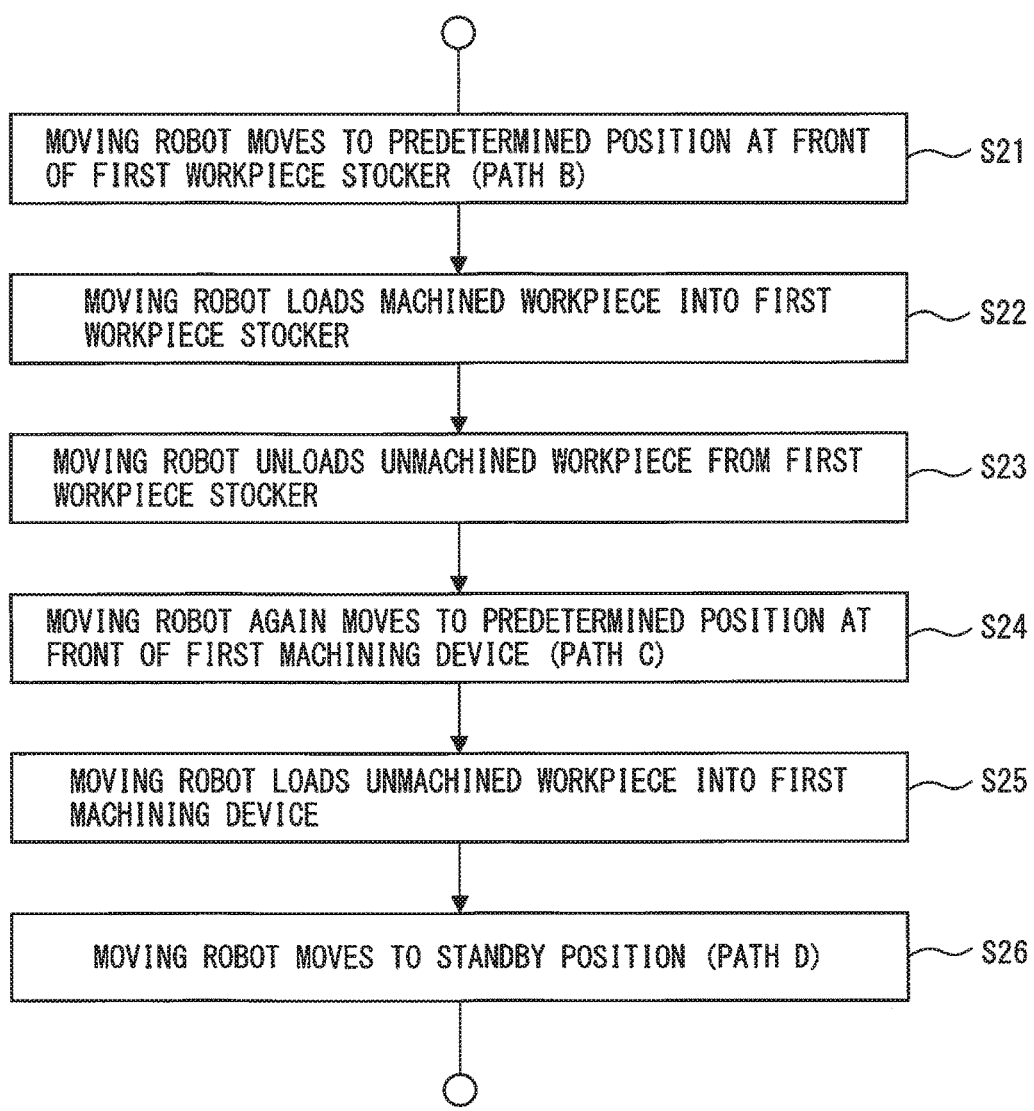

MACHINING SYSTEM AND MACHINE CONTROLLER IN WHICH A MOVING ROBOT LOADS AND UNLOADS AN ARTICLE WITH RESPECT TO MACHINING DEVICE

BACKGROUND OF THE INVENTION

1. Field of the Invention

The present invention relates to a machining system and a machine controller in which a moving robot loads and unloads of an article with respect to a machining device.

2. Description of the Related Art

In a production site, there are cases in which it is desired to load an unmachined article with respect to a machining device, such as a machine tool, and unload the machined article from the machining device using a robot. Therefore, it is necessary to install a robot in the vicinity of a loading/unloading port of the article in the machining device and communicably connect a controller which controls the robot (hereinafter referred to as robot controller) and a controller which controls the machining device (hereinafter referred to as machine controller) to each other. Further, it is also necessary to create in advance setting data and robot operation programs for allowing the robot to perform loading and unloading of the article with respect to the machining device, and store the same in the robot controller.

Since such installation and operation setting of the robot is difficult for a user of the machining device, it has been necessary for a user of the machining device to request an integrator specialized in robots at a cost so as to enable the robot to be used. Also when it is necessary to remove the robot from the machining device in accordance with a change of a production process, a removing operation of the robot has been a difficult operation for a user of the machining device. Thus, using the robot so as to load and unload the article with respect to the machining device has not been easy for a user of the machining device.

Then, as a technique for enabling easy use of the robot for a user of the machining device, there are, for example, Japanese Patent No. 4676544 and Japanese Patent No. 5160700.

Japanese Patent No. 4676544 discloses a robot controller for controlling a robot which feeds and takes out a workpiece with respect to a machine tool controlled by a machine tool controller. Further, in Japanese Patent No. 4676544, the robot controller is configured so as to obtain information relating to the machine tool from the machine tool controller through a communication network and display the information relating to the machine tool on a machine tool-related screen of a display section of a teach pendant.

In addition, Japanese Patent No. 5160700 discloses an NC machine tool system including an NC machine tool; an operation panel for the NC machine tool, an articulated robot disposed above the NC machine tool, a program storage element which stores programs for operating the articulated robot, and a robot controller which controls the articulated robot in accordance with the programs. Further, according to Japanese Patent No. 5160700, the operation panel includes a switch element which is operated to execute a program so as to operate the articulated robot, and the robot controller is configured to control the articulated robot so as to return the articulated robot along a movement path which is programmed in a program as executed by operating the switch element from a current position to a standby position.

SUMMARY OF INVENTION

However, as disclosed in Japanese Patent No. 4676544 and Japanese Patent No. 5160700 as described above and other documents, it is typical that setting data and robot operation programs for operating the robot with respect to the machining device are stored in advance in a memory in the robot controller.

It is assumed that it is configured such that one robot can move to the front of each of a plurality of machine tools and such one robot loads and unloads of a workpiece with respect to each of the plurality of machine tools. In such a case, it is necessary to store, in a memory in a robot controller provided to the robot, setting data and robot operation programs which correspond to each of the machine tools. In particular, it is necessary to prepare such robot operation programs and setting data in accordance with the type of machine tool, type of workpiece fixture jig provided in the machine tool, type of workpiece stocker which houses the unmachined workpiece that is loaded in the machine tool and the machined workpiece that is unloaded from the machine tool, and the number of machined article types, etc. Note that the machined article types as described above indicate the machined shape of the workpiece, i.e., the types of machined articles which are obtained by the machine tools.

Further in a specific example, when it is configured to enable 10 machine tools having types different from each other to respectively perform 10 types of machining, it becomes necessary to store 100 types of setting data and robot operation programs in a memory in one robot controller. Thus, there has been a problem that the more a number of the machine tools and a number of machined article types which can be changed by each of the machine tools increase, the more a storage capacity necessary for the memory in one robot controller increases.

In a case of the specific example as described above, it is also necessary that an operator correctly changes the setting data and the robot operation programs which are stored in the robot controller in accordance with a type of the machine tool as a movement destination of the robot and a machined article type as currently set in the machine tool as the movement destination. There has been a problem that in such a change operation, an operator erroneously selects setting data and the robot operation program as failing to correspond to a machining state of the machine tool as the movement destination of the robot.

Further, there may be also a case in which 10 robots are configured so as to be capable of moving respectively to the front of 10 machine tools, and the respective robots are configured to perform loading and unloading of the workpiece with respect to the corresponding 10 machine tools. In such a case, it is necessary that robot controllers respectively provided to the 10 robots have setting data and robot operation programs which respectively correspond to the 10 machine tools. Accordingly, there has been a problem that when it is necessary to modify setting data and a robot operation program for one machined article type in the certain machine tool, there occurs a modification operation of the setting data and the robot operation program with respect to the robot controllers of the respective 10 robots.

Due to the problems as described above, it has been not easy for a user of the machining device to use a robot. For automation of loading and unloading of an article with respect to the machining device, it has been desired that an operation of the robot can be easily set from the machine controller of the machining device.

According to one aspect of the present disclosure, a machining system including: a machining device which machines an article; a moving robot which can move to a predetermined first position adjacent to the machining device, the moving robot is allowed to move to the first position and perform at least one of loading of an unmachined article and unloading of the machined article with respect to the machining device; a machine controller which controls the machining device; and a robot controller which controls the moving robot is provided.

According to one aspect as described above, the machine controller includes:

a first storage section which stores a plurality of machining programs for obtaining a plurality of types of machined articles by the machining device, and stores, for each of the plurality of types of machined articles, a first setting data and a first robot operation program for allowing the moving robot to load the unmachined article and unload the machined article with respect to the machining device;

a setting section capable of selecting one from among the plurality of machining programs and setting the type of the machined article to be obtained by the machining device;

a determination section which determines whether or not the moving robot is disposed at the first position; and a first communication section configured to read from the first storage section the first setting data and the first robot operation program which correspond to the type of the machined article as set by the setting section when the determination section determines that the moving robot is disposed at the first position, and transmit the same to the robot controller, the robot controller includes a second communication section capable of receiving the first setting data and the first robot operation program which are transmitted from the first communication section, and the robot controller controls the moving robot on the basis of the first setting data and the first robot operation program which are received by the second communication section so that the moving robot performs at least one of loading of the unmachined article and unloading of the machined article with respect to the machining device.

According to another aspect of the present disclosure, there is provided a machine controller which controls a machining device in which a moving robot performs at least one of loading of an unmachined article and unloading of the machined article.

According to another aspect as described above, the machine controller includes:

a storage section which stores a plurality of machining programs for obtaining a plurality of types of machined articles by the machining device, and stores, for each of the plurality of types of machined articles, a setting data and a robot operation program for allowing the moving robot to perform loading of the unmachined article and unloading of the machined article with respect to the machining device;

a setting section which selects one from among the plurality of machining programs and sets the type of the machined article to be obtained by the machining device;

a determination section which determines whether or not the moving robot is disposed at a predetermined position adjacent to the machining device; and a communication section configured to read from the storage section the setting data and the robot operation program which correspond to the type of the machined article as set by the setting section when the determination section determines that the moving robot is disposed at the predetermined position, and transmit the same to a robot controller which controls the moving robot.

BRIEF DESCRIPTION OF THE DRAWINGS

Objects, features, and advantages of the present invention will become further clearer from the description of embodiments as described below in conjunction with the accompanying drawings. In the accompanying drawings:

FIG. 1 is a diagram for illustrating a configuration of a machining system according to an embodiment;

FIG. 2 is a plan view schematically illustrating one example of a movement path of an autonomous moving robot in the machining system according to an embodiment;

FIG. 3 is a flowchart for illustrating a flow of an unloading operation or a machined workpiece in the machining system as illustrated in FIG. 1; and FIG. 4 is a flowchart for illustrating a flow of a loading operation of the unmachined workpiece in the machining system as illustrated in FIG. 2.

DETAILED DESCRIPTION

Hereinafter, embodiments of the present invention will be described with reference to the accompanying drawings. Throughout the drawings, constitutional elements corresponding to one another are denoted by the same reference signs. To facilitate understanding, these figures are suitably changed in scale. Further, the embodiments as illustrated in the drawings are one example in order to carry out the present invention, and the present invention is not to be limited to the embodiments as illustrated.

FIG. 1 is a diagram for illustrating a configuration of a machining system according to an embodiment.

Referring to FIG. 1, a machining system 10 according to the present embodiment includes a machining device 11 which machines an article and a moving robot 12 which can move to a predetermined position (hereinafter referred to as first position) adjacent to the machining device 11. The moving robot 12 is a robot which is allowed to move to the first position as described above and performs at least one of loading of the unmachined article and unloading of the machined article with respect to the machining device 11.

The machining system 10 further includes a machine controller 13 which controls the machining device 11 and a robot controller 14 which controls the moving robot 12. In FIG. 1, one pair of the machining device 11 and the machine controller 13 and one pair of the moving robot 12 and the robot controller 14 are illustrated, to which, however, the present invention is not limited. In other words, there may be also one or more pairs of the machining device 11 and the machine controller 13 and there may be also one or more pairs of the moving robot 12 and the robot controller 14 as well.

The moving robot 12 includes a moving body 12a which moves in an optional direction and a robot 12b which is fixed on the moving body 12a. The moving body 12a is a carrier which is moved by an operator himself or an autonomous type moving body, such as an automated guided vehicle (AGV). In other words, the moving robot 12 may be also that which can change a position of the moving robot 12 by moving the carrier by an operator himself or also an autonomous moving robot which moves in accordance with a predetermined path using an AGV. In addition, the moving robot 12 is preferably provided with a fixture device (unillustrated) which can temporarily fix the moving body 12a so as not to move at a movement destination as desired.

Further, preferably, on the moving body 12a, the robot controller 14 is carried. When the moving body 12a is an AGV, the robot controller 14 is configured to control not only the robot 12b but also the AGV.

The robot 12b included in the moving robot 12 is, for example, an articulated robot which includes a plurality of arm portions and a plurality of joint portions which connects the arm portions to one another. To a top end of the arm portion which is the most distal among the plurality of arm portions of the robot 12b, a hand 15 as an end effector is fixed. The hand 15 is designed so as to be capable of holding and releasing the article. The end effector is not limited to the hand 15, but an optional device, such as an air chuck and an electromagnetic chuck, can be used. The robot 12b can dispose the article held by the hand 15 at a desired position.

Further, the robot 12b is preferably a human-collaborative robot which does not necessitate a safety fence that surrounds the robot 12b. To secure the safety of an operator, such a human-collaborative robot preferably has a contact stop function which detects a force, a moment, or the like at a time of contact when an operator and the robot 12b come into contact with each other to stop the robot 12b. Further, preferably, there is provided a safety function, such as stop of an operation of the robot 12b and reduction of an operation speed of the robot 12b when an operator enters a movable range of the robot 12b.

On the other hand, the machining device 11 is a machine tool, such as a machining center and an NC lathe. The machining device 11 as a machine tool includes, for example, a spindle head to which a tool is mounted and a moving table which is provided with a workpiece fixture jig for fixing a workpiece as the article to be machined. The spindle head, the moving table, etc. are covered by a housing, and the housing is provided with a door 11a. During machining of the workpiece, the door 11a is closed, and after completion of machining of the workpiece, the door 11a falls into an open state so that the workpiece can be exchanged with respect to the workpiece fixture jig in the housing. The machining device 11 including the spindle head, the moving table, and the door as described above, etc. is controlled by the machine controller 13, such as a computerized numerical controller (CNC).

When the machining device 11 is a machine tool as described above, the predetermined first position as described, above is set to be, for example, a predetermined position at the front of the door 11a of the machining device 11. When the moving robot 12 is provided at a predetermined position at the front of the door 11a and the door 11a is open, the robot 12b of the moving robot 12 is configured to load the unmachined workpiece into the housing of the machining device 11 and dispose the same at the workpiece fixture jig of the moving table. Further, the robot 12b is configured to take out the machined workpiece from the workpiece fixture jig of the moving table and unload the same out of the housing of the machining device 11. As of course, machining devices to which the present invention can be applied are not limited to the machine tool as described above.

Further, as illustrated in FIG. 1, the machine controller 13 according to the present embodiment includes a first storage section 16, a setting section 17, a determination section 18, and a first communication section 19.

The first storage section 16 stores a plurality of machining programs for obtaining a plurality of types of machined articles by the machining device 11. Further, the first storage section 16 stores, for each of the plurality of types of machined articles, first setting data and a first robot operation program for allowing the moving robot 12 to perform loading of the unmachined workpiece and unloading of the machined workpiece with respect to the machining device 11.

The types of the machined articles as described above indicate the machined shape of the workpiece, i.e., types of a machined article which is obtained by the machining device 11. Further, the setting data indicates position data and speed data which are necessary when the moving robot 12 is allowed to operate by the robot operation program, an interlock setting value, etc.

The setting section 17 is configured to be capable of selecting one from among the plurality of machining programs as described above and setting the type of the machined article to be obtained by the machining device 11. When the machining device 11 is a machining center, an operation panel provided to the machining center can be the setting section 17. In such a case, a person selects the machining program through the operation panel, whereby the type of the machined article to be obtained by the machining center is set.

The determination section 18 is configured to determine whether or not the moving robot 12 is disposed at the predetermined first position as described above, e.g., a predetermined position at the front of the door 11a of the machining device 11. To make such determination, the machining device 11 is preferably provided with a sensor, such as a camera, a laser tracker, and a proximity sensor, which can obtain a relative position and a distance with respect to the moving robot 12 approaching the machining device 11. In such a case, it is also possible that when the moving, robot 12 approaches the predetermined first position, a relative position and a distance between the machining device 11 and the moving robot 12 are detected by the sensor as described above, whereby the determination section 18 determines whether or not the moving robot 12 is disposed at the predetermined first position. Further, it is also possible that at the predetermined first position, a mark or a positioning member is disposed and an operator determines a position of the moving robot 12 so that the moving robot 12 coincides with the mark or the positioning member. In such a case, it is also possible that it is configured to be capable of inputting information that the moving robot 12 coincides with the mark or the positioning member from, for example, the operation panel to the machining device 11 and on the basis of such input information, the determination section 18 determines that the moving robot 12 is disposed at the predetermined first position.

Alternatively, it is also possible that when the moving robot 12 is an autonomous moving robot, it is configured that a signal that movement to the predetermined first position as described above is completed is transmitted from the robot controller 14 to the machine controller 13, and the determination section 18 determines on the basis of the signal that the moving robot 12 is disposed at the predetermined first position. As of course, such determination processes are one example.

The first communication section 19 is configured to read from the first storage section 16 the first setting data and the first robot operation program which correspond to the type of the machined article as set by the setting section 17 when the determination section 18 determines that the moving robot 12 is disposed at the predetermined first position, and transmit the same to the robot controller 14. Note that the first communication section 19 and a second communication section 20 as described below are parts which perform transmission and reception of information using a wireless communication, such as Wi-Fi and Bluetooth (registered trademark).

On the other hand, the robot controller 14 according to the present embodiment includes the second communication section 20. The second communication section 20 is configured to be capable of receiving the first setting data and the first robot operation program which are transmitted from the first communication section 19 of the machine controller 13.

The robot controller 14 controls the moving robot 12 on the basis of the first setting data and the first robot operation program which are received by the second communication section 20 so that the moving robot 12 performs at least one of loading of the unmachined workpiece and unloading of the machined workpiece with respect to the machining device.

As illustrated. in FIG. 1, the robot controller 14 as described above may further include a second storage section 21 which stores the first setting data and the first robot operation program which are received by the second communication section 20.

In particular, when the moving robot 12 is not provided with a carrier which is moved by an operator himself as the moving body 12*a* but is an autonomous robot which is provided with such an AGV as described above as the moving body 12*a*, the following embodiment is preferably adopted.

When the moving robot 12 is an autonomous robot, the second storage section 21 preferably stores navigation information for allowing the moving robot 12 to sequentially move to the predetermined first position as described above and a predetermined second position distant from the first position in association with proper identification information (hereinafter briefly referred to as ID) of the machining device 11.

The predetermined second position as described above may be, for example, a position adjacent to a storage base, such as a workpiece stocker, which stores the unmachined workpiece and the machined workpiece.

The navigation information as described above includes position data with respect to each of the first position and the second position, movement path data which is determined between the first position and the second position, and an AGV operation program which allows an AGV of the moving robot 12 to operate on the basis of the position data and the movement path data. For example, in a factory, between a plurality of production machines including the machining device 11, there are a plurality of passages through which the moving robot 12 can move and crossings of the passages. The second storage section 21 preferably stores in advance positions of such a plurality of passages, positions of the crossings of the passages, etc. as the movement path data as described above.

Further, the machine controller 13 is configured to transmit a movement command for calling the autonomous moving robot 12 and the proper ID of the machining device 11 from the first communication section 19 to the robot controller 14 in accordance with a progress state of machining of the machining device 11. A transmission timing of the movement command may also be a time when the machining device 11 terminates a machining operation or also be a certain time before a machining termination time which is estimated from an execution state of the machining program. In other words, the movement command is preferably transmitted in accordance with a progress state of machining.

In such a case, the robot controller 14 is configured to receive by the second communication section 20 the proper ID of the machining device 11 which is transmitted with the movement command as described above and read from the second storage section 21 the navigation information which corresponds to the proper ID of the machining device 11 as received. The robot controller 14 is configured to allow the moving robot 12 to sequentially move to the first position and the second position as described above on the basis of the navigation information as read.

Further, the robot controller 14 is preferably configured to control the moving robot 12 so that the moving robot 12 loads the unmachined workpiece and unloads the machined workpiece with respect to the storage base as described above when the moving robot 12 moves to the second position adjacent to the storage base.

In such a case, second setting data and a second robot operation program for allowing the moving robot 12 to perform loading of the unmachined workpiece and unloading of the machined workpiece with respect to the storage base are preferably transmitted in advance from the machine controller 13 to the robot controller 14.

In other words, similarly to the first setting data and the first robot operation program as described above, the second setting data and the second robot operation program are also stored in the first storage section 16 of the machine controller 13. Preferably, when the moving robot 12 moves to the first position adjacent to the machining device 11 as described above, the robot controller 14 receives from the machine controller 13 also the second setting data and the second robot operation program together with the first setting data and the first robot operation program.

Further specifically, the second setting data and the second robot operation program as describe above are stored, for each of the machined article types, in the first storage section 16 of the machine controller 13.

The first communication section 19 of the machine controller 13 is configured to read from the first storage section 16 also the second setting data and the second robot operation program which correspond to the type of the machined article as set by the setting section 17 when the determination section 18 determines that the moving robot 12 is disposed at the first position adjacent to the machining device 11 as described above, and transmit the same to the robot controller 14.

The second communication section 20 of the robot controller 14 is configured to receive the second setting data and the second robot operation program and allow the same to be stored in the second storage section 21.

The robot controller 14 is configured to allow the moving robot 12 to perform loading of the unmachined workpiece and unloading of the machined workpiece with respect to the storage base on the basis of the second setting data and the second robot operation program which are stored in the second storage section 21 when movement to the second position adjacent to the storage base as described above is made.

Note that each of the machine controller 13 and the robot controller 14 is configured using a computer system which includes a memory, a control processing unit (CPU), a communication control section, etc. which are connected to each other via a bus. The memory includes a read only memory (ROM), a random access memory (RAM), etc. In the ROM or the RAM in such a computer system, a computer program is suitably stored. Each CPU of the machine controller 13 and the robot controller 14 executes the computer program in the memory, whereby a function or an operation of the setting section 17, the determination section 18, the first communication section 19, the second communication section 20, the first storage section 16, the second storage section 21, etc. can be achieved.

FIG. 2 is a plan view schematically illustrating one example of the movement path of the autonomous moving robot 12 in the machining system 10 according to an embodiment. FIG. 3 is a flowchart for illustrating a flow of an unloading operation of a machined workpiece X1 in the machining system 10 as illustrated in FIG. 2. FIG. 4 is a flowchart for illustrating a flow of a loading operation of an unmachined workpiece X2 in the machining system 10 as illustrated in FIG. 2.

The machining system 10 as one example as illustrated in FIG. 2 is designed to include the plurality of machining devices 11, such as a first machining device 11A and a second machining device 11B, the moving robot 12, and workpiece stockers 22, such as a first workpiece stocker 22A and a second workpiece stocker 22B. Each of the machining devices 11A, 11B may be also the same machining device 11 or also the machining devices 11 different from each other. The first workpiece stocker 22A houses the machined workpiece X1 and the unmachined workpiece X2 with respect to the first machining device 11A, and the second workpiece stocker 22B houses a machined workpiece Y1 and an unmachined workpiece Y2 with respect to the second machining device 11B. Although unillustrated in FIG. 2, it is assumed that each of the machining devices 11A, 11B is provided with the machine controller 13, and the moving robot 12 is provided with the robot controller.

In FIGS. 3 and 4, an example of an operation flow of the machining system 10 related to only the first machining device 11A as illustrated in FIG. 2 is typically illustrated. To start the operation flow as illustrated in FIG. 3, it is assumed that in the first storage section 16 of the machine controller 13 of the first machining device 11A, a plurality of machining programs for obtaining a plurality of machined article types by the machining device are already stored. Further, it is assumed that in the first storage section 16 of the machine controller 13 of the first machining device 11A, the first setting data and the first robot operation program as described above and the second setting data and the second robot operation program as described above are also already stored. An operator operates a host computer which is suitably connected to the machine controller 13 or the operation panel (unillustrated), whereby a storage operation of such operation programs etc. is performed.

According to FIG. 3, first, at step S11, by the setting section 17 of the machine controller 13 provided to the first machining device 11A, the type of the machined article to be obtained with respect to the first machining device 11A is set. Specifically, an operator operates the machine controller 13 from the setting section 17, for example, the operation panel, and selects the machining program which allows the desired type of the machined article to be obtained from the first storage section 16 of the machine controller 13.

At subsequent step S12, a machining start command is inputted to the first machining device 11A. By the machining start command, the first machining device 11A starts a machining operation for obtaining the type of the machined article as set (step S13).

At subsequent step S14, the machine controller 13 provided to the first machining device 11A transmits a movement command for calling the moving robot 12 and proper identification information of the first machining device 11A from the first communication section 19 to the robot controller 14.

The robot controller 14 receives by the second communication section 20 the proper ID of the first machining device 11A which is transmitted with the movement command as described above and reads from the second storage section 21 navigation information which corresponds to the proper ID of the first machining device 11A as received. Further, the robot controller 14 is configured to allow the moving robot 12 to move to a predetermined position at the front of the door 11a of the first machining device 11A on the basis of the navigation information with respect to the first machining device 11A.

As a result, at step S15, the moving robot 12 moves from a standby position or a current position to the front of the door 11a of the first machining device 11A (see a path A indicated by a dotted-line arrow in FIG. 2).

At subsequent step S16, the machine controller 13 provided to the first machining device 11A determines that the moving robot 12 is disposed at the predetermined position (hereinafter briefly referred to as first position) at the front of the door 11a of the first machining device 11A (pairing completed).

Specifically, the first machining device 11A is provided with a sensor, such as a camera, a laser tracker, and a proximity sensor, which can obtain a relative position and a distance with respect to the moving robot 12 approaching the first machining device 11A. On the basis of a value detected by the sensor, the determination section 18 of the machine controller 13 determines whether or not the moving robot 12 is disposed at the first position as described above. As another determination process, when it is determined that a movement operation of the moving robot 12 to the first position as described above is terminated, a movement termination signal is transmitted to the machine controller 13. It is also possible that on the basis of such input of the movement termination signal, the machine controller 13 determines that the moving robot 12 is disposed at the first position as described above.

At subsequent step S17, the first communication section 19 of the machine controller 13 reads from the first storage section 16 first setting data and a first robot operation program which correspond to the type of the machined article as set by the setting section 17, and transmits the same to the robot controller 14. Then, also second setting data and a second robot operation program which correspond to the type of the machined article as set by the setting section 17 are preferably configured to be transmitted to the robot controller 14.

At subsequent step S18, the second communication section 20 of the robot controller 14 receives the first setting data and the first robot operation program which are transmitted. Then, the second setting data and the second robot operation program which are transmitted from the first communication section 19 are stored in the second storage section 21 of the robot controller 14.

At subsequent step S19, machining by the first machining device 11A is completed. In accordance with completion of machining, the machine controller 13 of the first machining device 11A controls an opening/closing device (unillustrated) of the door 11a of a housing of the first machining device 11A so as to open the door 11a. Then, the machine controller 13 preferably notifies from the first communication section 19 to the robot controller 14 that the door 11a open.

Such a machining completion step is not required to follow step S18 as described above but may be performed any time after step S13 as described above. In other words, steps S14 to steps S18 as described above may be also performed during machining or also performed after completion of machining.

After the door 11a is open, the robot controller 14 controls the moving robot 12 on the basis of the first setting data and the first robot operation program which are received by the second communication section 20. Thereby, the moving robot 12 holds by the hand 15 the machined workpiece X1 in the first machining device 11A and unloads the machined workpiece X1 from the first machining device 11A (step S20).

Then, as illustrated in FIG. 4, at step S21, the moving robot 12 moves from the predetermined position at the front of the door 11a of the first machining device 11A to a predetermined position (hereinafter briefly referred to as second position) at the front of the first workpiece stocker 22A (see a path B indicated by a dotted-line arrow in FIG. 2). The robot controller 14 allows an AGV of the moving robot 12 to operate on the basis of the navigation information with respect to the first machining device 11A as described above, whereby such is achieved. Further, preferably, an alignment mark is provided at the first workpiece stocker 22A or a floor surface around the same and it is configured to be capable of determining whether or not the moving robot 12 is disposed at the second position as described above using the alignment mark.

When the moving robot 12 is at the second position as described above, the robot controller 14 controls the moving robot 12 on the basis of the second setting data and the second robot operation program which are stored in the second storage section 21. Thereby, the moving robot 12 loads the machined workpiece X1 which is held by the hand 15 into the first workpiece stocker 22A (step S22). Subsequently, the moving robot 12 holds by the hand 15 the workpiece X2 as unmachined on the first workpiece stocker 22A and unloads the workpiece X2 as unmachined from the first workpiece stocker 22A (step S23). In other words, in exchange for the machined workpiece which is placed on the first workpiece stocker 22A, the unmachined workpiece is taken out from the first workpiece stocker 22A.

At subsequent step S24, the moving robot 12 again moves from the second position as described above to the predetermined position (i.e., the first position) at the front of the door 11a of the first machining device 11A (see a path C indicated by a dotted-line arrow in FIG. 2). After movement, similarly to step S16 as described above, the machine controller 13 provided to the first machining device 11A determines that the moving robot 12 is disposed at the first position as described above (pairing completed). Further, similarly to steps S17 and S18, the second communication section 20 of the robot controller 14 receives the first setting data and the first robot operation program as described above from the first communication section of the machine controller 13.

Subsequently, the robot controller 14 controls the moving robot 12 on the basis of the first setting data and the first robot operation program which are received by the second communication section 20. Thereby, the moving robot 12 loads by the hand 15 the unmachined workpiece into the first machining device 11A (step S25).

At subsequent step S26, the moving robot 12 moves from the predetermined position at the front of the door 11a of the first machining device 11A to a predetermined standby position (see a path D indicated by a dotted-line arrow in FIG. 2). The robot controller 14 allows the AGV of the moving robot 12 to operate on the basis of the navigation information with respect to the first machining device 11A as described above, whereby such is also achieved.

Then, the robot controller 14 waits for a movement command for calling the moving robot 12. When the robot controller 14 receives the movement command by the second communication section 20, again; steps S15 to S26 as described above are performed.

When the movement command as described above is the movement command from another machining device 11, for example, the second machining device 11B, an operation similar to steps S15 to S26 as described above is preferably performed with respect to the second machining device 11B and the second workpiece stocker 22B. Further, preferably, it is configured that when the robot controller 14 receives the movement command from the plurality of machining devices 11, the moving robot 12 is allowed to preferentially move to the machining device 11 which corresponds to the movement command as first received.

According to the machining system 10 according to the present embodiment as described above, the setting section 17 of the machine controller 13 can select one from among the plurality of machining programs and setting the type of the machined article to be obtained by the machining device 11. The first storage section 16 of the machine controller 13 provided to the machining device 11 stores, for each of the types of the machined articles, the first setting data and the first robot operation program for allowing the moving robot 12 to perform loading of the unmachined workpiece and unloading of the machined workpiece with respect to the machining device 11. Further, it is configured that when the determination section 18 of the machine controller 13 determines that the moving robot 12 is disposed at the predetermined first position adjacent to the machining device 11, the first setting data and the first robot operation program which correspond to the type of the machined article as set by the setting section 17 are read from the first storage section 16 as described above and transmitted to the robot controller 14.

Accordingly, to the robot controller 14, the first setting data and the first robot operation program which are suitable for the type of the machined article as currently set in the machining device 11 are appropriately inputted. In other words, in the robot controller 14, such setting data and robot operation program as to obtain the type of the machined article different from the type of the machined article as set in the machining device 11 as a movement destination of the moving robot 12 fail to be selected.

Further, the first storage section 16 of the machine controller 13 is allowed to store, for each of the types of the machined articles, the first setting data and the first robot operation program for allowing the moving robot 12 to operate so that even when a number of the machining devices 11 and a number of the types of the machined articles which can be changed in each machining device 11 increase, a memory capacity necessary for the robot controller 14 does not increase. In other words, the first setting data, the first robot operation program, etc. are information of the moving robot 12 depending on workpiece machining and only such information is stored in the first storage section 16 of the machine controller 13 so that even when the types of the machined articles increase, a memory capacity of the robot controller 14 fails to increase. Note that the navigation information necessary for movement of the autonomous moving robot 12 is stored in the robot controller 14.

In addition, it is assumed that the machining system 10 includes the plurality of moving robots 12 and it becomes necessary at certain machining device to modify setting data and a robot operation program for one type of the machined article. In such a case, the setting data and the robot operation program which are stored in the first storage section 16 of the machine controller 13 provided to the certain machining device 11 as described above are modified, only whereby the setting data and the robot operation program as modified can be used in all the moving robots 12.

Accordingly, a failure to modify and an error to modify setting data and a robot operation program no longer occur.

Thus, for automation of loading and unloading of the workpiece with respect to the machining device 11, an operation of the moving robot 12 can be easily set from the machine controller 13 of the machining device 11.

While embodiments of the present invention have been described above, a person skilled in the art could understand that various modifications and changes can be made without departing from the scope of claimed subject matter described below.

In addition, to solve the problem of the present disclosure, various aspects and effects thereof as described below can be provided. Note that numerals between parentheses in the below description of the aspects correspond to reference signs in the drawings of the present disclosure.

For example, according to a first aspect of the present disclosure, there is provided a machining system (10) including: a machining device (11) which machines an article; a moving robot (12) which can move to a predetermined first position adjacent to the machining device (11), the moving robot (12) is allowed to move to the first position and performing at least one of loading of an unmachined article and unloading of the machined article with respect to the machining device (11); a machine controller (13) which controls the machining device (11); and a robot controller (14) which controls the moving robot (12).

In the machining system (10) according to the first aspect, it is possible that the machine controller (13) includes:
- a first storage section (16) which stores a plurality of machining programs for obtaining a plurality of types of machined articles by the machining device (11), and stores, for each of the plurality of types of machined articles, a first setting data and a first robot operation program for allowing the moving robot (12) to load the unmachined article and unload the machined article with respect to the machining device (11);
- a setting section (17) capable of selecting one from among the plurality of machining programs and setting the type of the machined article to be obtained by the machining device (11);
- a determination section (18) which determines whether or not the moving robot (12) is disposed at the first position; and
- a first communication section (19) configured to read from the first storage section (16) the first setting data and the first robot operation program which correspond to the type of the machined article as set by the setting section (17) when the determination section (18) determines that the moving robot (12) is disposed at the first position, and transmit the same to the robot controller (14), the robot controller (14) includes a second communication section (20) capable of receiving the first setting data and the first robot operation program which are transmitted from the first communication section (19), and the robot controller (14) controls the moving robot (12) on the basis of the first setting data and the first robot operation program which are received by the second communication section (20) so that the moving robot (12) performs at least one of loading of the unmachined article and unloading of the machined article with respect to the machining device (11).

According to the first aspect as described above, for automation of loading and unloading of the article with respect to the machining device, an operation of the robot can be easily set from the machine controller of the machining device.

In other words, when the determination section of the machine controller determines that the moving robot is disposed at the predetermined first position adjacent to the machining device, the first setting data and the first robot operation program which correspond to the type of the machined article as set by the setting section are read from the first storage section as described above and transmitted to the robot controller.

Accordingly, in the robot controller, such setting data and robot operation program as to obtain the type of the machined article different from the type of the machined article as set in the machining device as a movement destination of the moving robot fail to be selected.

In addition, the first storage section of the machine controller is allowed to store, for each of the types of machined articles, the first setting data and the first robot operation program as described above so that even when a number of the machining devices and a number of the types of machined articles which can be changed in each machining device increase, a memory capacity necessary for the robot controller does not increase.

Further, in a case of the machining system including the plurality of moving robots, the setting data and the robot operation program which are stored in the first storage section of the machine controller provided to the certain machining device as described above are modified, only whereby the setting data and the robot operation program as modified can be used in all the robot controllers of the moving robots. Accordingly, a failure to modify and an error to modify setting data and a robot operation program no longer occur.

In addition, according to another aspect, there is provided the machining system (10) according to the first aspect as described above, in which it is possible that the moving robot (12) is an autonomous moving robot, the robot controller (14) further includes a second storage section (21) which stores navigation information for allowing the moving robot (12) to sequentially move to the first position and a predetermined second position distant from the first position, the navigation information is stored in association with an identification information proper to the machining device, the machine controller (13) is configured to transmit a movement command for calling the moving robot (12) and the proper identification information of the machining device (11) from the first communication section (19) to the robot controller (14) in accordance with a progress state of machining, and the robot controller (14) is configured to receive by the second communication section (20) the proper identification information of the machining device (11), the proper identification information is transmitted with the movement command, read from the second storage section (21) the navigation information corresponding to the proper identification information of the machining device (11) as received, and allow the moving robot (12) to sequentially move to the first position and the second position on the basis of the navigation information as read.

According to another aspect as described above, to the machining device which is a control target of the machine controller that transmits the movement command, the autonomous moving robot can be allowed to move.

Further, according to still another aspect, there can be provided the machining system (10) according to another aspect as described above, in which at the second position, a storage base (22) which stores the unmachined article and the machined article is provided, the first storage section (16) further stores, for each of the plurality of types of machined articles, a second setting data and a second robot operation program for allowing the moving robot (12) to load the unmachined article and unload the machined article with respect to the storage base (22), the first communication section (19) is configured to read from the first storage section (16) also the second setting data and the second robot operation program which correspond to the type of the machined article as set by the setting section (17) when the determination section (18) determines that the moving robot (12) is disposed at the first position, and transmit the same to the robot controller (14), the second communication section (20) is configured to receive also the second setting data and the second robot operation program and allow the same to be stored in the second storage section (21), and the robot controller (14) controls the moving robot (12) on the basis of the second setting data and the second robot operation program which are stored in the second storage section (21) so that the moving robot (12) loads the unmachined article and unloads the machined article with respect to the storage base (22) when the moving robot (12) moves to the second position.

According to still another aspect as described above, when the moving robot is moved to the storage base which houses the unmachined article and the machined article, the moving robot can be allowed to perform loading of the unmachined article and unloading of the machined article with respect to the storage base.

Further, according to a second aspect of the present disclosure, there can be provided a machine controller (13) which controls a machining device (11) in which a moving robot (12) performs at least one of loading of an unmachined article and unloading of a machined article, the machine controller (13) including:

a storage section (16) which stores a plurality of machining programs for obtaining a plurality of types of machined articles by the machining device (11), and stores, for each of the plurality of types of machined articles, setting data and a robot operation program for allowing the moving robot (12) to load the unmachined article and unload the machined article with respect to the machining device (11);

a setting section (17) which selects one from among the plurality of machining programs and sets the type of the machined article to be obtained by the machining device (11);

a determination section (18) which determines whether or not the moving robot (12) is disposed at a predetermined position adjacent to the machining device (11); and a communication section (19) configured to read from the storage section (16) the setting data and the robot operation program which correspond to the type of the machined article as set by the setting section (17) when the determination section (18) determines that the moving robot (12) is disposed at the predetermined position, and transmit the same to a robot controller (14) which controls the moving robot (12).

According to the second aspect, effects similar to those of the first aspect as described above can be obtained. In other words, for automation of loading and unloading of the article with respect to the machining device, an operation of the robot can be easily set from the machine controller of the machining device.

The invention claimed is:

1. A machining system, comprising:
 a machining device including a housing having a door, the machining device configured to machine an article inside the housing;
 a moving robot configured to
  move to a predetermined first position in front of the door of the housing of the machining device, and
  perform at least one of loading of an unmachined article through the door into the housing or unloading of the machined article from the housing through the door;
 a machine controller configured to control the machining device; and
 a robot controller configured to control the moving robot, wherein the machine controller includes
  a first storage section configured to
   store a plurality of machining programs for obtaining a plurality of types of machined articles by the machining device, and
   store, for each of the plurality of types of machined articles, a first setting data and a first robot operation program for causing the moving robot to load the unmachined article through the door into the housing and unload the machined article from the housing through the door;
  a setting section configured to
   select one from among the plurality of machining programs, and
   set the type of the machined article to be obtained by the machining device;
  a determination section configured to determine whether or not the moving robot is disposed at the first position in front of the door; and
  a first communication section configured to, in response to the determination section determining that the moving robot is disposed at the first position in front of the door,
   read, from the first storage section, the first setting data and the first robot operation program which correspond to the type of the machined article as set by the setting section, and
   transmit the first setting data and the first robot operation program to the robot controller,
 the robot controller includes a second communication section configured to receive the first setting data and the first robot operation program which are transmitted from the first communication section, and
 the robot controller is configured to control the moving robot on a basis of the first setting data and the first robot operation program which are received by the second communication section to cause the moving robot to perform at least one of loading of the unmachined article or unloading of the machined article with respect to the machining device.

2. The machining system according to claim 1, wherein the moving robot is an autonomous moving robot,
 the robot controller further includes a second storage section configured to store navigation information for the moving robot to sequentially move to the first position and a predetermined second position distant from the first position, the navigation information being stored in association with an identification information associated with the machining device, the machine controller is configured to transmit a movement command for calling the moving robot and the identification information of the machining device from the first communication section to the robot controller in accordance with a progress state of machining, and the robot controller is configured to receive, by the second communication section, the identification information of the machining device, the identification information being transmitted with the movement command, read, from the second storage section the navigation information corresponding to the identification information of the machining device as received, and cause the moving robot to sequentially move to the first position and the second position on a basis of the navigation information as read.

3. The machining system according to claim 2, further comprising a storage base at the second position and configured to store the unmachined article and the machined article, wherein the first storage section is configured to further store, for each of the plurality of types of machined articles, a second setting data and a second robot operation program for causing the moving robot to unload the machined article into the storage base and load another unmachined article from the storage base, the first communication section is configured to read, from the first storage section, the second setting data and the second robot operation program which correspond to the type of the machined article as set by the setting section in response to the determination section determining that the moving robot is disposed at the first position, and transmit the second setting data and the second robot operation program to the robot controller, the second communication section is configured to receive the second setting data and the second robot operation program, and cause the second setting data and the second robot operation program to be stored in the second storage section, and the robot controller is configured to control the moving robot on a basis of the second setting data and the second robot operation program which are stored in the second storage section to cause the moving robot to unload the machined article into the storage base and load the another unmachined article from the storage base in response to the moving robot being disposed at the second position.

4. The machining system according to claim 3, wherein the machine controller is configured to set the type of the machined article to be obtained by the machining device, control the machining device to machine the article inside the housing to obtain the set type of the machined article, transmit the movement command and the identification information of the machining device from the first communication section to the second communication section of the robot controller, determine the moving robot being disposed at the first position in subsequence to the robot controller moving the moving robot from a third position to the first position in front of the door on the basis of the navigation information, the third position being different from the first and second positions, cause the first communication section to read and transmit the first robot operation program and the first setting data in the first storage section to the second communication section of the robot controller, and control the door of the housing of the machining device to open, in subsequence to a completion of the machining of the article.

5. The machining system according to claim 4, wherein the robot controller is configured to control the moving robot to unload the machined article from the housing in subsequence to the opening of the door of the housing following the completion of the machining of the article, move to the second position, unload the machined article into the storage base and load the another unmachined article from the storage base, move to the first position and unload the another unmachined article into the machining device, and move to the third position.

6. A machine controller configured to control a machining device including a housing having a door, the machining device configured to machine an article inside the housing, wherein a moving robot is configured to perform at least one of loading of an unmachined article through the door into the housing or unloading of the machined article from the housing through the door, the machine controller comprising:

a storage section configured to store a plurality of machining programs for obtaining a plurality of types of machined articles by the machining device, and store, for each of the plurality of types of machined articles, a setting data and a robot operation program for causing the moving robot to load the unmachined article through the door into the housing and unload the machined article from the housing through the door;

a setting section configured to select one from among the plurality of machining programs, and set the type of the machined article to be obtained by the machining device;

a determination section configured to determine whether or not the moving robot is disposed at a predetermined position in front of the door of the housing of the machining device; and a communication section configured to, in response to the determination section determining that the moving robot is disposed at the predetermined position in front of the door, read, from the storage section, the setting data and the robot operation program which correspond to the type of the machined article as set by the setting section, and transmit the the setting data and the robot operation program to a robot controller configured to control the moving robot.

* * * * *